June 21, 1955  R. R. SMYTH  2,711,486
SECONDARY EMISSION MULTIPLIER AMPLIFIER
Filed July 19, 1951
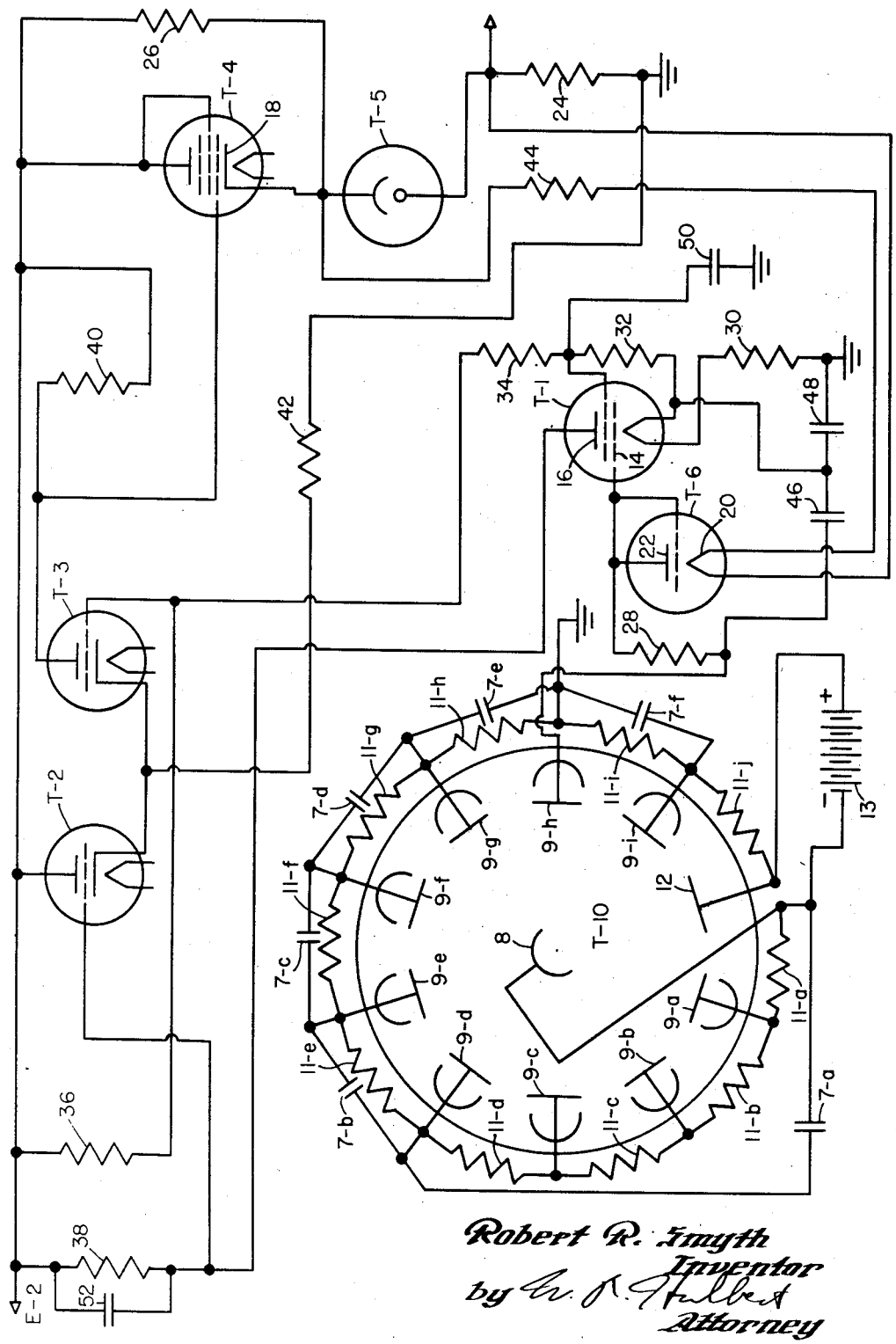
Robert R. Smyth
Inventor
by W. R. Hulbert
Attorney United States Patent Office 2,711,486
Patented June 21, 1955

2,711,486

SECONDARY EMISSION MULTIPLIER AMPLIFIER

Robert R. Smyth, Milton, Mass., assignor to Tracerlab, Inc., Boston, Mass., a corporation of Massachusetts Application July 19, 1951, Serial No. 237,535

8 Claims. (Cl. 250—207)

This invention relates to the exterior amplification of current developed within a secondary emission multiplier tube or more specifically to the amplification and logarithmic measurement of current from a photomultiplier dynode.

For a discussion of the advantages of logarithmic detection of radiations and particularly the use of a logarithmic diode for such detection, reference may be had to copending application of Marvin G. Schorr, Serial No. 198,785, filed December 2, 1950, now Patent No. 2,676,268, dated April 20, 1954.

The art has long used photomultiplier tubes to give an electrical response to light energy but without exception every workable device has measured the current flow from the collector of the photomultiplier. So far as I am aware it has never been thought possible to connect to a dynode and successfully measure current flow in the tube.

I have adapted a logarithmic diode to measure such current flow from a dynode of a photomultiplier tube, giving the proper polarity of current flow for detection, and surprisingly yielding a better signal to noise ratio than the best of prior logarithmic circuitry taking the response from the collector of the tube.

The specific problem solved by the circuit of the invention was the detection of gamma radiation and to indicate the logarithm of its magnitude. This necessitated the presentation of current flow to a logarithmic amplifier in response to the current developed within the photomultiplier tube responsive to the radiation.

The primary object of the invention is to make possible the logarithmic detection and amplification of current flow within a secondary emission multiplier tube.

Another object is the logarithmic detection and amplification of the current flow from a dynode of a photomultiplier tube, the latter being exposed to radiations, such as those emanating from a crystal in the excited state.

A further object is to develop a more satisfactory signal to noise ratio from a secondary emission multiplier tube than has heretofore been available from the usual collector connected circuits.

Still a further object is to provide a constant filament current to the filamentary type logarithmic diode employed in the circuit and yet to give a floating cathode potential.

These and other numerous objects, features and advantages of the invention will appear from the following detailed description of specific circuitry embodying and utilizing the same taken in connection with the accompanying drawing in which the single figure illustrates a preferred circuit.

Referring to the drawing, the radiation I am desirous of detecting falls upon the cathode 8 of a secondary emission multiplier tube, T–10, and the resultant electronic emission is multiplied in the manner known to those working in this art. The prior art had utilized the collector 12 of the tube in the measurement of the signal while my specific problem required a current flow of the opposite polarity than that available from the collector. The dynodes 9–a, 9–b, 9–c, etc. of the multiplier tube T–10 have current flow of the opposite polarity of the collector and thus offered the basic solution to my problem. For operation, the secondary emission multiplier tube cathode 8, collector 12 and dynodes must be maintained at certain potentials which for such dynodes is taken from a floating source, e. g. a series of resistors 11–a, 11–b, etc. across the terminals of high voltage supply 13 comprising a battery having a potential E—E. A source of rectified alternating current may be found more suitable than the battery 13 for some applications.

Assuming that the multiplier tube signal is taken from the eighth dynode 9–h, as shown in the figure, the increase in electron flow therefrom during the multiplication operation of the tube makes for a rise in potential of the grid 14 of vacuum tube $T_1$. The plate 16 of $T_1$ as a result drops in potential, and this is amplified by vacuum tubes $T_2$, $T_3$, and $T_4$ with the now amplified potential change being fed back from the cathode 18 of tube $T_4$ to the cathode 20 of diode $T_6$. This high gain feedback circuit maintains the potential of the grid 14 of $T_1$ relatively constant.

As explained more fully in Patent No. 2,676,268 above referred to, the principle of operation of the present amplifier circuit depends upon the characteristics of a diode-type vacuum tube whose characteristics are such that the voltage drop across the same will be a logarithmic function of the current passing therethrough. Thus, in the present circuit a diode-type tube T–6, which may be a tube having one or more grids diode-connected (a CK570AX, for example), has its anode 22 connected to the control grid 14 of the tube T–1. Its filamentary cathode 20 is operated by the voltage regulator tube T–5, as hereinafter more fully explained, and is also connected to the output resistor 24.

In this operation of a logarithmic diode the change in current flow from the dynode is measured as a change in potential between the anode 22 and cathode 20 of the diode $T_6$. The cathode 20, operating as part of the feedback loop and at a floating potential, is connected to the output resistor 24. The high gain feedback circuit is maintaining the anode of the filamentary diode at a constant potential, which is necessary so that the potential differences between the seventh, eighth, and ninth dynodes 9–g, 9–h and 9–i are not appreciably varied, which if not done would disturb the operating conditions of the multiplier tube T–10, allowing the change of potential of the cathode 20 of the diode to indicate fully the magnitude of the voltage developed across the same.

For proper operation of the logarithmic diode $T_6$, it is necessary to provide the filament with a constant current supply floating in potential. This might have been accomplished with a battery connected to the filament leads, but I have developed a circuit for accomplishing this same purpose using a voltage regulator tube $T_5$. Voltage regulator tubes are generally used to provide a voltage drop, but I have by interposing it between resistors 24 and 26 used it as a constant current supply source for the filament of the logarithmic diode. In addition the placing of the voltage regulator tube $T_5$ in the cathode circuit of the vacuum tube $T_4$ utilizes the filament supply circuit as a feedback means and the floating potential of the voltage regulator tube $T_5$ makes possible the change of potential of the cathode 20 of the logarithmic diode and the resultant output voltage.

The present invention utilizing the dynode current flow results in a much improved signal to noise ratio than is possible using the collector of a 1P21 photomultiplier as the source of signal current. With this type of secondary emission multiplier tube the dynodes five through nine (9–e through 9–i) have been found satisfactory, however, dynodes 9–g and 9–h have been found to be best with the latter the better of those two. Possibly the decrease of signal to noise ratio in going from dynode eight to dynode nine is that the latter has greater leakage current, i. e., the current flow with no signal.

Typical circuit values which I have found to yield good results are:

E—E (battery 13 or other D. C. source) = 600–1000 v.
$E_2$ = 250 v.

Tubes:
    T–1 = CK571AX
    T–2 and T–3 = 12AX7
    T–4 = 6AQ5
    T–5 = VR105
    T–6 = CK570AX (diode connected)
    T–10 = 1P21

Resistors:
    $11-a$ = 1.2 megohms
    $11-b$ through $11-j$ = 1 megohm
    24 = 500 ohms
    26 = 5,000 ohms
    28 = 1 megohm
    30 = 1,800 ohms
    32 = 300 ohms
    34 = 1,000 ohms
    36 = 22,000 ohms
    38 = 50 megohms
    40 = 390,000 ohms
    42 = 18,000 ohms
    44 = 5,500 ohms Capacitors:
    $7-a$ through $7-f$ = .01 mf.
    46 = 100 mf.
    48 = .01 mf.
    50 = .01 mf.
    52 = 4700 mmf.

My invention, though initiated to fulfill the need of the logarithmic detection of current flow within a photomultiplier, such photomultiplier tube responding to light radiation from a scintillation type gamma detector, may be used wherever response from a secondary emission multiplier tube is measured. The peculiar usage of the voltage regulator tube as a constant current supply source of floating potential is by no means limited to this type of circuit but might well be adapted to fulfill any need for a constant current supply. Accordingly, while I have disclosed and described a presently preferred circuit according to the invention, it will nevertheless be understood that various changes and modifications may be made therein by those skilled in the art but within the spirit and scope of the appended claims.

I claim:

1. In combination, a photomultiplier tube having a cathode, a collector and a plurality of dynodes, a high voltage supply for said photomultiplier tube, a filamentary type diode having its anode connected to one of said dynodes for producing a voltage of a magnitude logarithmically proportional to the current flow from said one dynode, an amplifier connected to said diode to amplify the change in potential thereacross, feedback means including a cathode follower circuit coupled between said amplifier and the filamentary cathode of said diode for maintaining the anode of said diode at a relatively constant potential, and a voltage regulator tube connected in said cathode follower circuit for supplying constant current to the filament of said diode at a floating potential.

2. In combination, a photomultiplier tube having a cathode, a collector and a plurality of dynodes, a high voltage supply connected across the cathode and collector of said photomultiplier tube, a filamentary type diode having its anode connected to one of the dynodes of said photomultiplier tube for producing a voltage of a magnitude logarithmically proportional to the electron flow from said one dynode, a vacuum tube amplifier connected to amplify the change of potential across said diode, a voltage regulator tube having its anode connected to the cathode of the final tube of said amplifier, an output resistor connected between the cathode of said voltage regulator tube and a point of reference potential, and means connecting the filamentary cathode of said diode across said voltage regulator tube to provide for said filament a constant current supply at floating potential and further to provide a high grain feedback circuit for maintaining the anode of said diode at a relatively constant potential.

3. In combination, a photomultiplier tube having a cathode, a collector and a plurality of dynodes, a source of high voltage for said photomultiplier tube, a filamentary type diode having its anode connected to one of the dynodes of said photomultiplier tube for producing a voltage of a magnitude logarithmically proportional to the current flow from said one dynode, means connected to said diode for amplifying the change of potential thereacross, a cathode follower circuit including an electron tube having a voltage regulator tube and a resistor connected in series in the cathode circuit thereof, and means connecting the filamentary cathode of said diode across said voltage regulator tube to provide for said filament a constant current supply at a floating potential, said last-mentioned means further providing a feedback loop for maintaining the anode of said diode at substantially constant potential.

4. In combination, a photomultiplier tube having a cathode, a collector and a plurality of dynodes, a high voltage supply circuit connected to said cathode, said collector and all of said dynodes except the eighth, a filamentary type diode having its anode resistively connected to said eighth dynode for producing a voltage thereacross of a magnitude logarithmically proportional to the current flow from said eighth dynode, an amplifier connected to amplify the change in potential across said diode, a cathode follower circuit including an electron tube having at least an anode, a cathode and a control grid, a voltage regulator tube having its anode connected to the cathode of said electron tube and a first resistor connected between the cathode of said voltage regulator tube and a point of reference potential, a second resistor connected in shunt with said electron tube, and means connecting the filamentary cathode of said diode across said voltage regulator tube to provide for said filament a constant supply current at a floating potential and for providing a feedback loop for maintaining the anode of said diode and consequently said eighth dynode at a relatively constant potential.

5. In a radiation measuring instrument, a photomultiplier tube having a plurality of dynodes, a voltage supply for said photomultiplier tube, a diode having an anode and a filamentary cathode, means connecting the anode of said diode to one of said dynodes for producing a voltage of a magnitude logarithmically proportional to the current flow from said one dynode, a multistage vacuum tube amplifier having a cathode follower output stage, means connecting the first stage of said amplifier to the anode of said diode, a voltage regulator tube and an output resistor connected in series in the cathode circuit of said cathode follower output stage, and means connecting the filamentary cathode of said diode across said voltage regulator tube.

6. Apparatus according to claim 5 in which the anode of said diode is connected to one of the last three of said dynodes.

7. A logarithmic amplifier, comprising, in combination, a photomultiplier tube having a plurality of dynodes, a diode having an anode and a filamentary cathode, means connecting the anode of said diode to one of said dynodes for producing a voltage across said diode of a magnitude logarithmically proportional to the current flow from said one dynode, a vacuum tube amplifier having its control grid connected to the anode of said diode for amplifying the change in potential across said diode, means including a voltage regulator tube in the output circuit of said amplifier coupled to the filamentary cathode of said diode for supplying a constant current to said filamentary cathode at a floating potential, and feedback means connected from the output circuit of said amplifier to the cathode of said diode for maintaining the anode of said diode at a relatively constant potential.

8. In combination, a photomultiplier tube having a plurality of dynodes, a diode having an anode and filamentary cathode, means connecting the anode of said diode to one of said dynodes, said diode being adapted to produce a voltage thereacross logarithmically proportional to the current flow from said one dynode, an amplifier connected to amplify the change in potential across said diode, a low impedance output circuit for said amplifier including a voltage regulator tube arranged to maintain a substantially constant voltage across its terminals and to permit a variation in potential of said terminals with respect to a point of reference potential, and means connecting the filamentary cathode of said diode across the terminals of said voltage regulator tube.

References Cited in the file of this patent
UNITED STATES PATENTS

| | | |
|---|---|---|
| 2,492,901 | Sweet | Dec. 27, 1949 |
| 2,503,165 | Meyer | Apr. 4, 1950 |
| 2,523,387 | Friedman | Sept. 26, 1950 |
| 2,656,478 | Friedman | Oct. 20, 1953 |